United States Patent
Choi et al.

(10) Patent No.: US 11,364,893 B2
(45) Date of Patent: Jun. 21, 2022

(54) AUTONOMOUS DRIVING SYSTEM AND AUTONOMOUS STEERING APPARATUS

(71) Applicant: KAR Co., Ltd, Ulsan (KR)

(72) Inventors: Sungjae Choi, Ulsan (KR); Jin U Kwon, Ulsan (KR)

(73) Assignee: KAR Co., Ltd, Ulsan (KR)

(*) Notice: Subject to any disclaimer, the term of this patent is extended or adjusted under 35 U.S.C. 154(b) by 341 days.

(21) Appl. No.: 16/720,804

(22) Filed: Dec. 19, 2019

(65) Prior Publication Data
US 2021/0146910 A1    May 20, 2021

(30) Foreign Application Priority Data
Nov. 20, 2019 (KR) .................. 10-2019-0149733

(51) Int. Cl.
| | |
|---|---|
| *B60W 10/20* | (2006.01) |
| *B60W 10/18* | (2012.01) |
| *B62D 1/16* | (2006.01) |
| *B60W 60/00* | (2020.01) |
| *G05D 1/00* | (2006.01) |

(52) U.S. Cl.
CPC ............ *B60W 10/20* (2013.01); *B60W 10/18* (2013.01); *B62D 1/16* (2013.01); *G05D 1/0088* (2013.01); *B60W 60/00253* (2020.02); *B60W 2510/20* (2013.01); *B60W 2710/18* (2013.01); *B60W 2710/20* (2013.01)

(58) Field of Classification Search
CPC ....................................................... B62D 1/16
See application file for complete search history.

(56) References Cited

U.S. PATENT DOCUMENTS

| | | | |
|---|---|---|---|
| 5,127,670 A | * | 7/1992 | Hoblingre ................ B62D 1/16 280/779 |
| 2002/0091479 A1 | | 7/2002 | Maruko et al. |
| 2015/0090520 A1 | * | 4/2015 | Shibazaki ................ B62D 1/16 180/446 |

FOREIGN PATENT DOCUMENTS

| | | | | |
|---|---|---|---|---|
| CN | 203780606 U | * | 8/2014 | |
| CN | 104520165 B | * | 4/2017 | ............... B62D 1/16 |
| JP | 2002002503 A | * | 1/2002 | |
| JP | 2002337673 A | | 11/2002 | |

OTHER PUBLICATIONS

U.S. Appl. No. 16/697,750, filed Nov. 27, 2019.
Notice of Allowance in U.S. Appl. No. 16/697,750, 8 pages (dated Apr. 20, 2022).

\* cited by examiner

*Primary Examiner* — Jacob D Knutson
(74) *Attorney, Agent, or Firm* — Finch & Maloney PLLC

(57) ABSTRACT

The present invention relates to an autonomous driving system and an autonomous steering apparatus. An autonomous steering apparatus includes: a support bracket having a preset volume, and formed at an inner upper portion thereof with a lower reception portion having a groove or hole structure recessed downward by a preset depth; and a steering drive shaft having a preset length, and having a lower end rotatably provided in the lower reception portion and an upper end connected to a steering system of a vehicle.

5 Claims, 8 Drawing Sheets

30

AUTONOMOUS DRIVING SYSTEM AND AUTONOMOUS STEERING APPARATUS

CROSS-REFERENCE TO RELATED APPLICATIONS

This application claims the benefit of Republic of Korea Patent Application 10-2019-0149733 (filed 20 Nov. 2019), the entire disclosure of which is hereby incorporated by reference herein.

BACKGROUND OF THE INVENTION

1. Field of the Invention

The present invention relates to an autonomous driving system and an autonomous steering apparatus.

2. Description of the Prior Art

A vehicle is a transportation means for helping a vehicle driver and passengers to reach a desired destination as it travels on the ground through control of a steering wheel that is a steering control means, an accelerator pedal that is an acceleration/deceleration control means, and a brake pedal.

In recent years, studies on an autonomous vehicle that is constituted by mounting a plurality of sensors, a steering control means, and an acceleration/deceleration control means on an existing vehicle to be autonomously driven to a preset destination without an operation of a driver by identifying a road state, the locations of neighboring vehicles and objects, and a traffic signal.

SUMMARY OF THE INVENTION

The present invention provides an autonomous driving system and an autonomous steering apparatus, which may effectively perform autonomous driving.

According to an aspect of the present invention, an autonomous steering apparatus includes: a support bracket having a preset volume, and formed at an inner upper portion thereof with a lower reception portion having a groove or hole structure recessed downward by a preset depth; a steering drive shaft having a preset length, and having a lower end rotatably provided in the lower reception portion and an upper end connected to a steering system of a vehicle; an upper bracket having an upper reception portion formed vertically through an inner central region of the upper bracket, coupled to a top surface of the support bracket such that the steering drive shaft is located in the upper reception portion, and provided on one side thereof with a power transmission portion having a groove structure recessed inward from an outside and connected to the upper reception portion; and a shaft drive member provided in the power transmission portion and connected to the steering drive shaft.

In addition, a steering drive portion having a gear tooth structure may be provided on an outer circumference at one longitudinal point of the steering drive shaft, and the shaft drive member may be configured as a gear rotatably engaged with the steering drive portion.

In addition, the autonomous steering apparatus may further include a steering driver connected to the shaft drive member to rotate the shaft drive member.

In addition, the autonomous steering apparatus may further include a steering driver encoder connected to the steering driver to detect an operating state of the steering driver.

According to another aspect of the present invention, an autonomous driving system includes: a driving sensor; a controller configured to control a state of a vehicle while reflecting a signal provided by the driving sensor; an autonomous deceleration control apparatus configured to control a brake system of the vehicle; and an autonomous steering apparatus configured to control a steering system of the vehicle, wherein the autonomous steering apparatus includes: a support bracket having a preset volume, and formed at an inner upper portion thereof with a lower reception portion having a groove or hole structure recessed downward by a preset depth; a steering drive shaft having a preset length, and having a lower end rotatably provided in the lower reception portion and an upper end connected to a steering system of a vehicle; an upper bracket having an upper reception portion formed vertically through an inner central region of the upper bracket, coupled to a top surface of the support bracket such that the steering drive shaft is located in the upper reception portion, and provided on one side thereof with a power transmission portion having a groove structure recessed inward from an outside and connected to the upper reception portion; and a shaft drive member provided in the power transmission portion and connected to the steering drive shaft.

According to an embodiment, the present invention can provide an autonomous driving system and an autonomous steering apparatus, which effectively perform the autonomous driving.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described in more detail with reference to the accompanying drawings. The embodiments of the present invention may be modified in various forms, and the scope of the present invention should not be construed to be limited to the following embodiments. The embodiments of the present invention are provided to describe the present invention for those skilled in the art more completely. Accordingly, the shapes of the components of the drawings are exaggerated to emphasize clearer description thereof.

Figure 1:
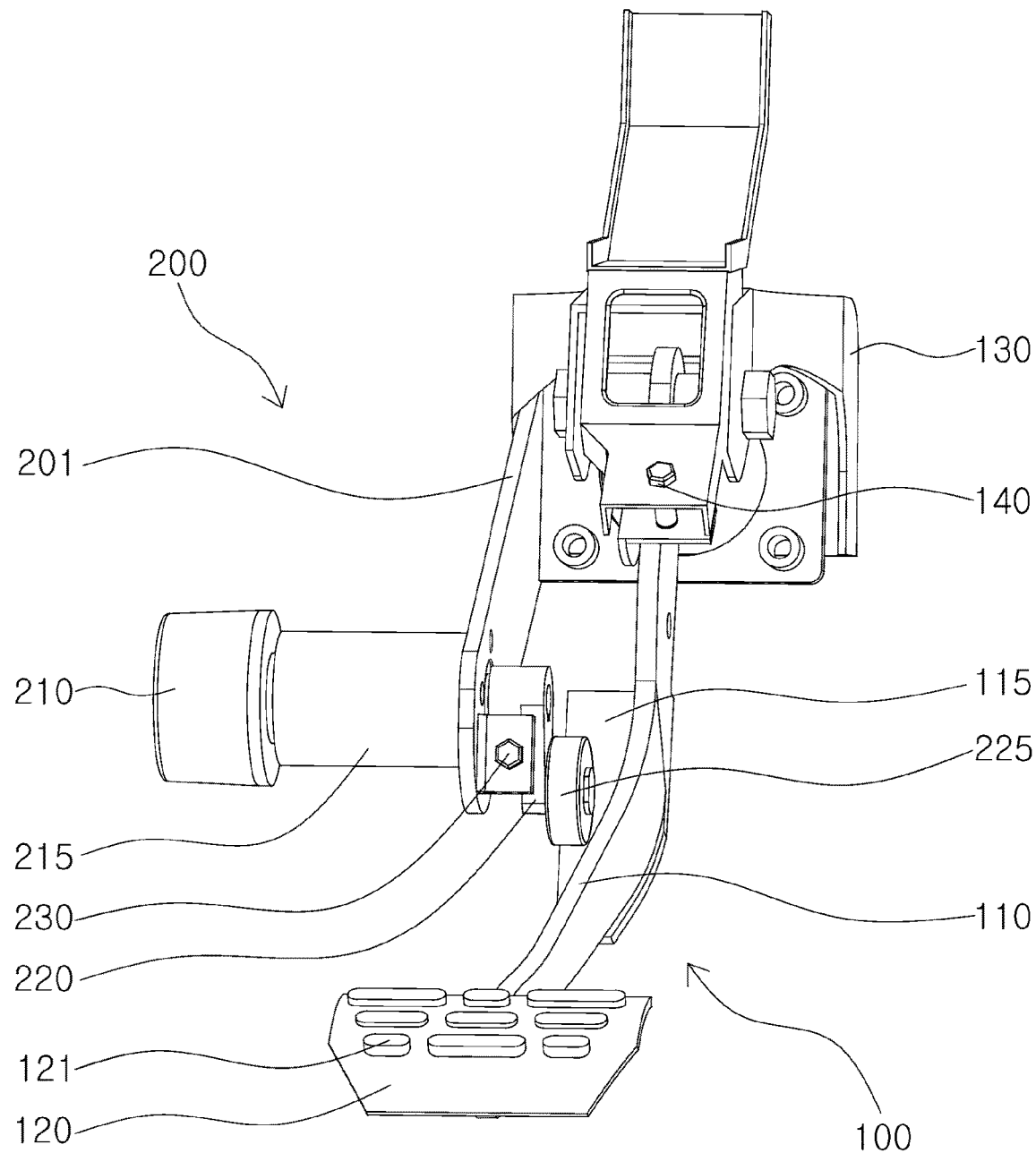
FIG. 1 is a view illustrating an autonomous deceleration control apparatus according to an embodiment of the present invention.

FIG. 1 is a view illustrating an autonomous deceleration control apparatus according to an embodiment of the present invention.

Referring to FIG. 1, an autonomous deceleration control apparatus 10 controls a brake system. The autonomous deceleration control apparatus 10 includes a brake module 100 and a brake control module 200.

Hereinafter, a direction that faces the front side of a vehicle when the autonomous deceleration control apparatus 10 will be referred to as a front side, and a direction that faces the rear side of the vehicle will be referred to as a rear side.

The brake module 100 is provided for the vehicle, and causes a signal, by which the brake system is operated provided to decelerate or stop rotation of wheels of the vehicle, to be input. The brake module 100 is located at a lower portion of the vehicle, and may be provided to be operated through a leg of the driver.

The brake module 100 includes a pedal link 110, a brake pedal 120, and a pedal encoder 130.

The pedal link 110 has a preset length, and is provided such that one end thereof, which is located on the front side is rotatable within a preset range. As an example, the pedal link 110 may be provided to be rotatable upwards and downwards within a preset range while one end thereof acts as an axis. A torque is applied to one end of the pedal link 110 such that an opposite end of the pedal link 100 is located on the uppermost side (hereinafter, a brake non-driving location) in a movement range when a force is not applied to an opposite end thereof.

A brake sensor 140 may be provided adjacent to the pedal link 110. The brake sensor 140 is provided to detect whether the pedal link 110 is in a brake non-driving location state. As an example, the brake sensor 140 may be a contact sensor that is located adjacent to one end of the pedal link 110. Further, the pedal link 110 may be provided to contact the brake sensor 140 at the brake non-driving location, and to be separated from the brake sensor 140 if it is rotated downwards.

The brake pedal 120 having a preset area may be provided at an opposite end of the pedal link 110. A load cell 121 may be located in the brake pedal 120. The load cell 121 may be provided to detect whether a force is applied to the brake pedal 120, the magnitude of a pressure applied to the brake pedal, and the like.

The pedal encoder 130 is located adjacent to one end of the pedal link 110, and detects the rotational state of the pedal link 110. In detail, the pedal encoder 130 may be provided to detect whether the pedal link 110 is in the brake non-driving location state, a rotation degree when the brake pedal 120 is rotated downwards at the brake non-driving location, and the like.

The brake control module 200 is located adjacent to the brake module 100 and controls an operational state of the brake module 100 instead of the driver when the vehicle is in the autonomous driving state. As an example, the frame 201 may be located adjacent to the brake module 100, and the brake control module 200 may be located on the left side of the brake module 100 or on the right side of the brake module 100 while being fixed by the frame 201. FIG. 1 illustrates a case in which the brake control module 200 is located on the left side of the brake module 100.

The brake control module 200 includes a driver 210, a movable link 220, and a link detection sensor 230.

The driver 210 provides power for operating the brake control module 200. As an example, the driver 210 may be a motor or the like.

The movable link 220 has a preset length, and is provided to be rotatable about a shaft (hereinafter, a movable link shaft 221) provided at one end thereof by the power provided by the driver 210. Then, a decelerator 215 may be located between the driver 210 and the movable link 220, and the movable link 220 may be rotated to be decelerated at a preset ratio. The movable link 220 is located adjacent to the pedal link 110 to be separated from the pedal link 110 or press the pedal link 110 according to rotation thereof.

As an example, the movable link 220 is located on one side of the pedal link 110, and the movable link shaft 221 is provided in the leftward/rightward direction that are perpendicular to the forward/rearward direction such that the movable link 220 is rotatable about the movable link shaft 221 on a plane that is perpendicular to the leftward/rightward direction. Accordingly, according to the rotational state of the movable link 220, an opposite end of the movable link 220 may be spaced apart from the pedal link 110, contact the pedal link 110, or press the pedal link 110 downwards.

Further, a contact part 115 that protrudes toward the movable link 220 by a preset width and has a preset length in the forward/rearward direction is formed in the pedal link 110, and the movable link 220 is provide to press the contact part 115 according to a rotational state thereof.

Further, a pressing roller 225 provided to be rotatable may be provided at an opposite end of the movable link 220. A shaft of the pressing roller 225 may be provided in parallel to the movable link shaft 221. Accordingly, when the movable link 220 is rotated in a state in which a force is applied between the opposite end of the movable link 220 and the pedal link 110, unnecessary frictions may be removed by the rotation of the pressing roller 225.

Figure 9:
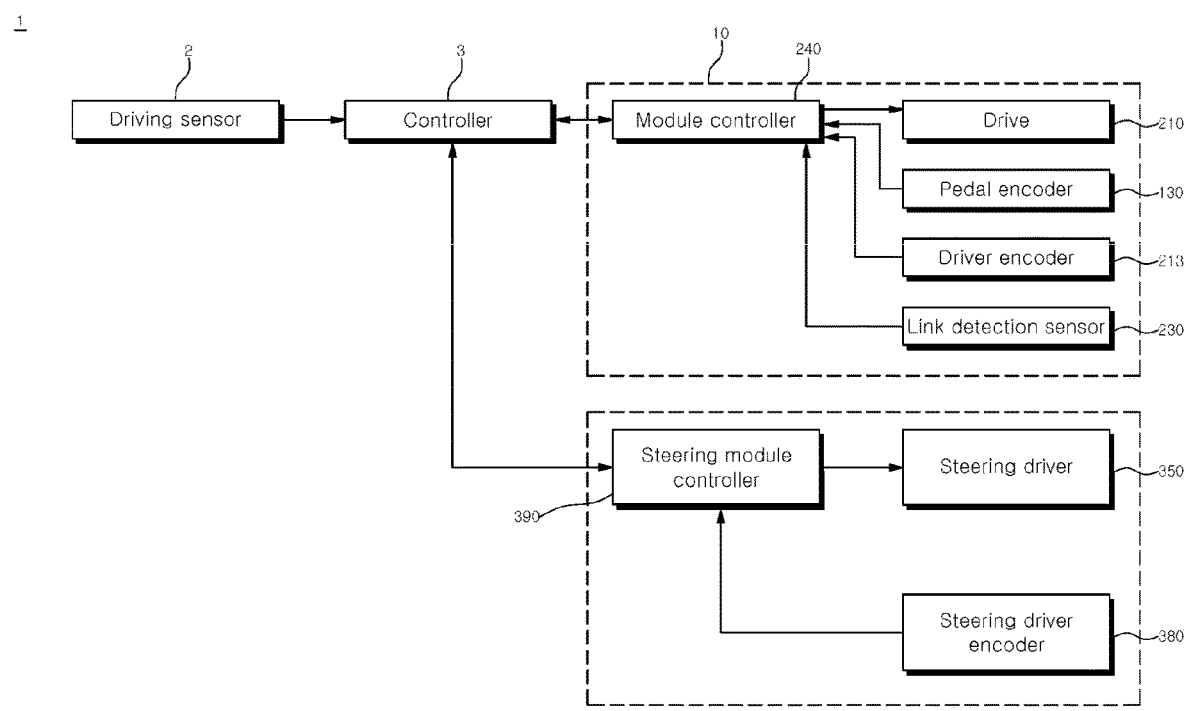
FIG. 9 is a view illustrating an autonomous driving system including the autonomous deceleration control apparatus.

Further, a driver encoder (213 of FIG. 9) is connected to the driver 210 to provide the operational state of the driver 210 and the movable link state information on the location of the movable link 220 to the module controller 3 (240 of FIG. 9).

Figure 2:
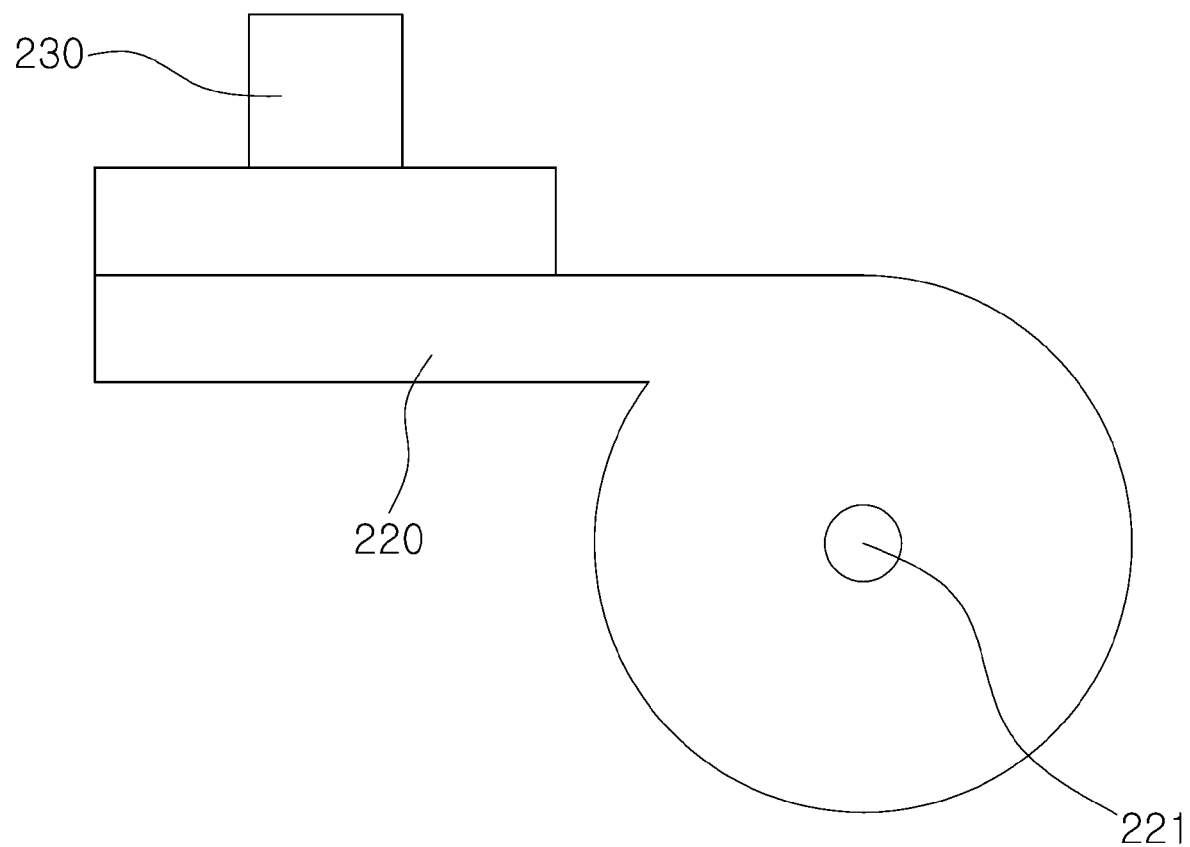
FIG. 2 is a view illustrating the location of a movable link when the autonomous deceleration control apparatus of FIG. 1 is in a manual mode state.

FIG. 2 is a view illustrating the location of a movable link when the autonomous deceleration control apparatus of FIG. 1 is in a manual mode state.

A manual mode state is a state in which the vehicle is driven while the driver operates the brake module 100. In the manual mode state, the movable link 220 is located at the manual mode location. The manual mode location corresponds to a state in which the pedal link 110 and a driving link are separated from each other in the case in which the pedal link 110 is at the brake non-driving location.

Referring to FIG. 2, the link detection sensor 230 is located at an upper point of the movable link 220 at the manual mode location to detect whether the movable link 220 is at the manual mode location. As an example, the link detection sensor 230 is a contact sensor, and if the movable link 220 is at the manual mode location, the link detection sensor 230 contacts the movable link 220 to detect that the movable link 220 is at the manual mode location while having a high precision. Although the opposite end of the movable link 220 may be located on the rear or front side of the movable link shaft 221 at the manual mode location, it is preferable that the opposite end of the movable link 220 is located on the rear side of the movable link shaft 221. FIG. 2 illustrates that the opposite end of the movable link 220 is located on the rear side of the movable link shaft 221.

Figure 3:
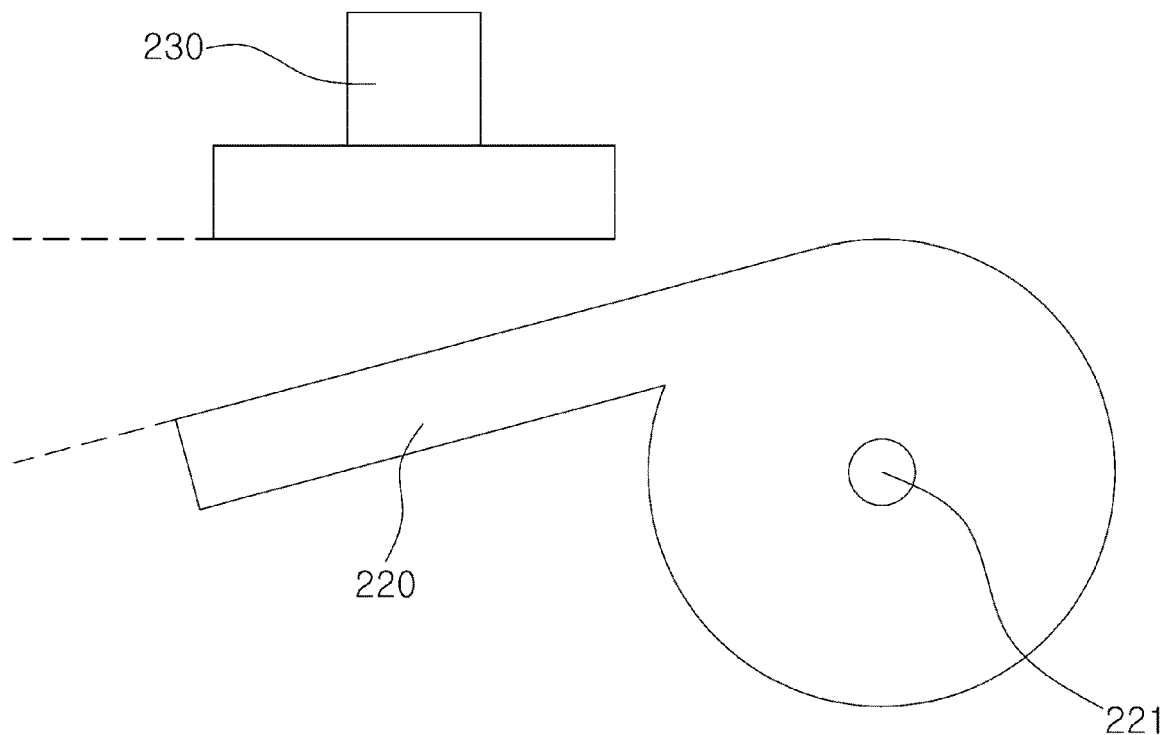
FIGS. 3 and 4 are views illustrating the location of a movable link when the autonomous deceleration control apparatus is in an autonomous mode state.
Figure 4:
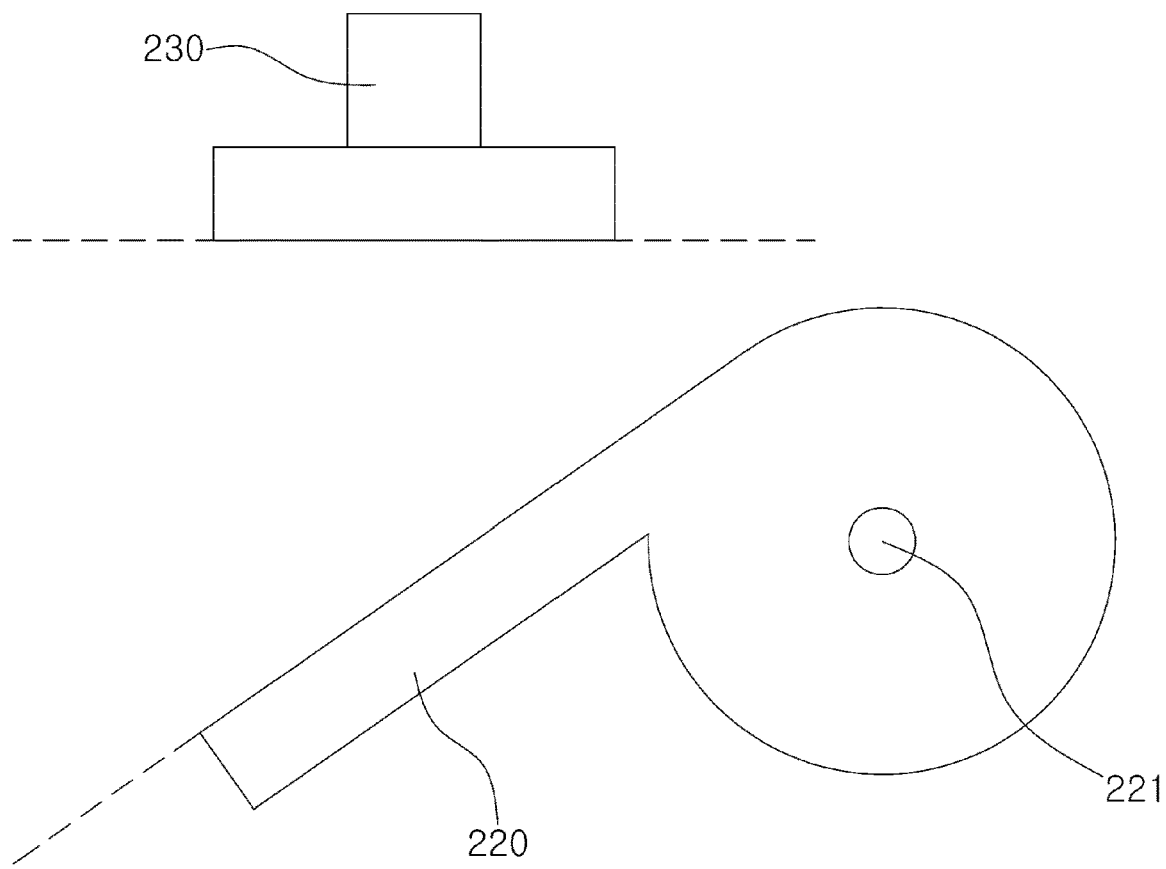

FIGS. 3 and 4 are views illustrating the location of a movable link when the autonomous deceleration control apparatus is in an autonomous mode state. FIG. 3 is a view illustrating that the movable link is at a standby location, and FIG. 4 is a view illustrating that the movable link is at the driving location.

The autonomous mode state is a state in which the vehicle is driven while the brake module 100 is controlled by the brake control module 200.

Referring to FIGS. 3 and 4, in the autonomous mode state, the opposite end of the movable link 220 is located to be rotated toward the lower side of the manual mode location, and the movable link 220 is at a location (hereinafter, the autonomous mode location) at which the movable link 220 is not detected by the link detection sensor 230.

The autonomous mode location includes a standby location and a driving location.

The standby location is a location at which the opposite end of the movable link 220 is moved to the lower side of the manual mode location and is spaced apart from the pedal link 110 and the movable link 220 with reference to the brake non-driving location. Further, the driving location is a location at which the opposite end of the movable link 220 is moved to the lower side of the standby location and the movable link 220 pushes the pedal link 110 downwards from the brake non-driving location. In detail, a preset gap is present in a movement locus of the movable link 220 between the manual mode location and the driving location, and the movable link 220 is in the standby location state if the movable link 220 is located in the gap.

If the movable link 220 is moved from the standby location to the driving location, the opposite end of the movable link 220 contacts the contact part 115. Further, if the downward rotation degree of the movable link 220 increases in a range of the driving location, the braking force by the brake system increases as the downward rotation degree of the pedal link 110 increases.

In particular, if the opposite end of the movable link 220 is located on the rear side of the movable link shaft 221 at the manual mode location, the opposite end of the movable link 220 presses and rotates the pedal link 110 downwards while moving from the rear side to the front side in the driving location state. Accordingly, the distance by which the opposite end of the movable link 220 presses the pedal link 110 downwards increases, the distance between the opposite end of the movable link 220 and the one end of the pedal link 110 decreases. That is, the distance between a point at which the movable link 220 presses the pedal link 110 and the rotational axis of the pedal link 110 gradually decreases such that the distance, by which the pedal link 110 is rotated downwards, increases even when the movable link 220 is rotated by the same angle.

When the driver 210 is configured to rotate the movable link 220 at different speeds, the control relationship becomes complex, and accordingly, the possibility of the malfunction of the driver 210 increases, deteriorating stability. Meanwhile, the autonomous deceleration control apparatus 10 according to the present invention may be controlled such that the brake module 100 is switched to a weak state or a sharply braked state even when the movable link 220 is driven in a state in which the rotational speed of the movable link 220 is not switched for each section. Accordingly, the autonomous deceleration control apparatus 10 has a high system stability.

In general cases, a vehicle is driven while the states of pressing the pedal link 110 weakly and not pressing the pedal link 110 are repeated. Further, in an emergency situation, the pedal link 110 is greatly rotated downwards in a short time. In correspondence, if the opposite end of the movable link 220 is located on the rear side of the movable link shaft 221 at the manual mode location, the rotation degree of the pedal link 110 may be adjusted while the pedal link 110 is not sharply rotated downwards due to the rotation of the movable link 220 in general cases, and the pedal link 110 may be rotated at a high speed due to the rotation of the movable link 220 in a section that requires emergency braking.

Figure 5:
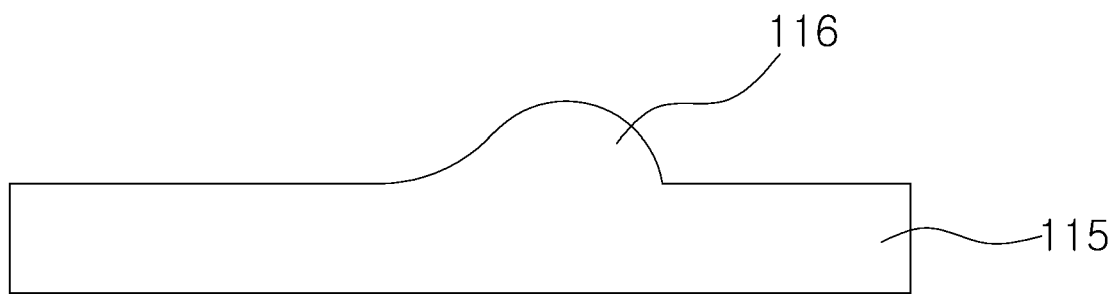
FIG. 5 is a view illustrating a contact part according to an embodiment.

FIG. 5 is a view illustrating a contact part according to an embodiment.

FIG. 5 is drawn when viewed from the same direction of FIG. 2.

Referring to FIG. 5, a point of the upper surface of the control part 115, which is spaced apart forwards from the rear end thereof by a preset distance may protrude upwards further than the rear end thereof. For example, the contact part 115 may be provided such that the upper surface thereof is in a planar form. Further, a protrusion 116 may be formed on the upper surface of the contact surface 115 at a point that is spaced apart forwards from the rear end of the contact surface 115 by a preset distance. Accordingly, if the movable link 220 is rotated such that the opposite end of the movable link 220 is located at a point at which the protrusion 116 is located, the pedal link 110 may be sharply rotated downwards by the protrusion 116, achieving sharp braking efficiently.

Figure 6:
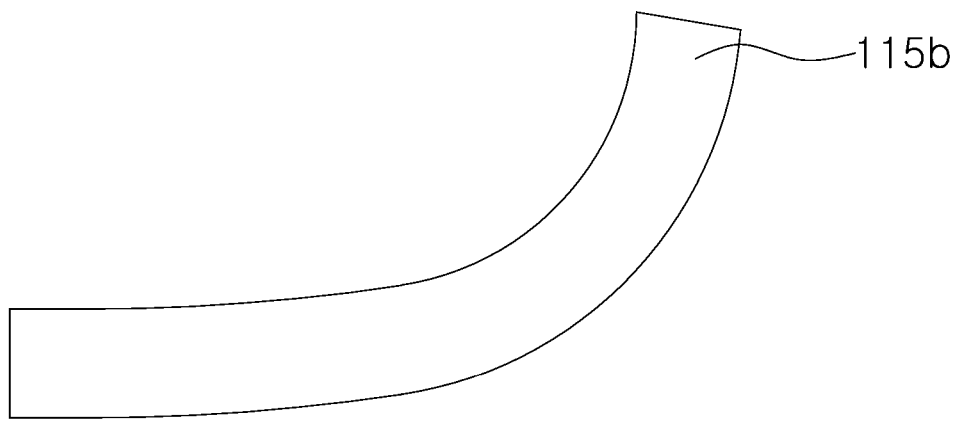
FIG. 6 is a view illustrating a contact part according to another embodiment.

FIG. 6 is a view illustrating a contact part according to another embodiment.

FIG. 6 is drawn when viewed from the same direction of FIG. 5.

Referring to FIG. 6, the contact part 115*b* may be provided such that the upper surface of the contact part 115*b* has curvatures that are different for areas. As an example, the contact part 115*b* may be provided such that the upward inclination of the contact part 115*b* becomes larger as the front area thereof goes the front side rather than the rear area thereof, and thus the rear area protrudes upwards further than the rear area. Accordingly, when the opposite end of the pedal link 110 is located in the front area of the contact part 115*b* rather than it is located in the rear area of the contact part 115*b*, the degree, by which the pedal link 110 is rotated downwards, is increased by rotation of the pedal link 110 corresponding to a unit angle. Accordingly, in a section that requires emergency, the rotational speed of the pedal link 110 may be effectively increased while the rotational speed of the movable link 220 is not sharply increased.

Figure 7:
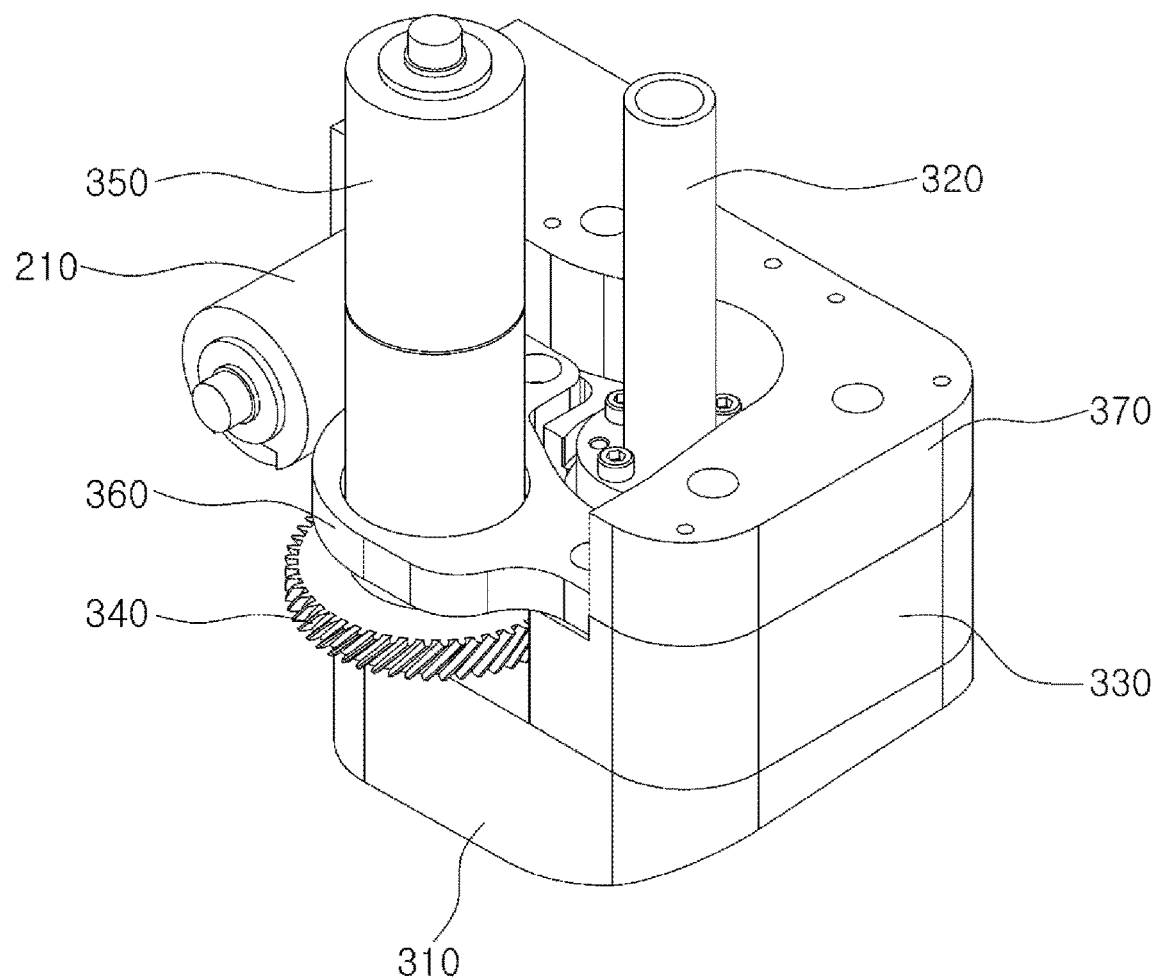
FIG. 7 is a view illustrating an autonomous steering apparatus according to an embodiment of the present invention.
Figure 8:
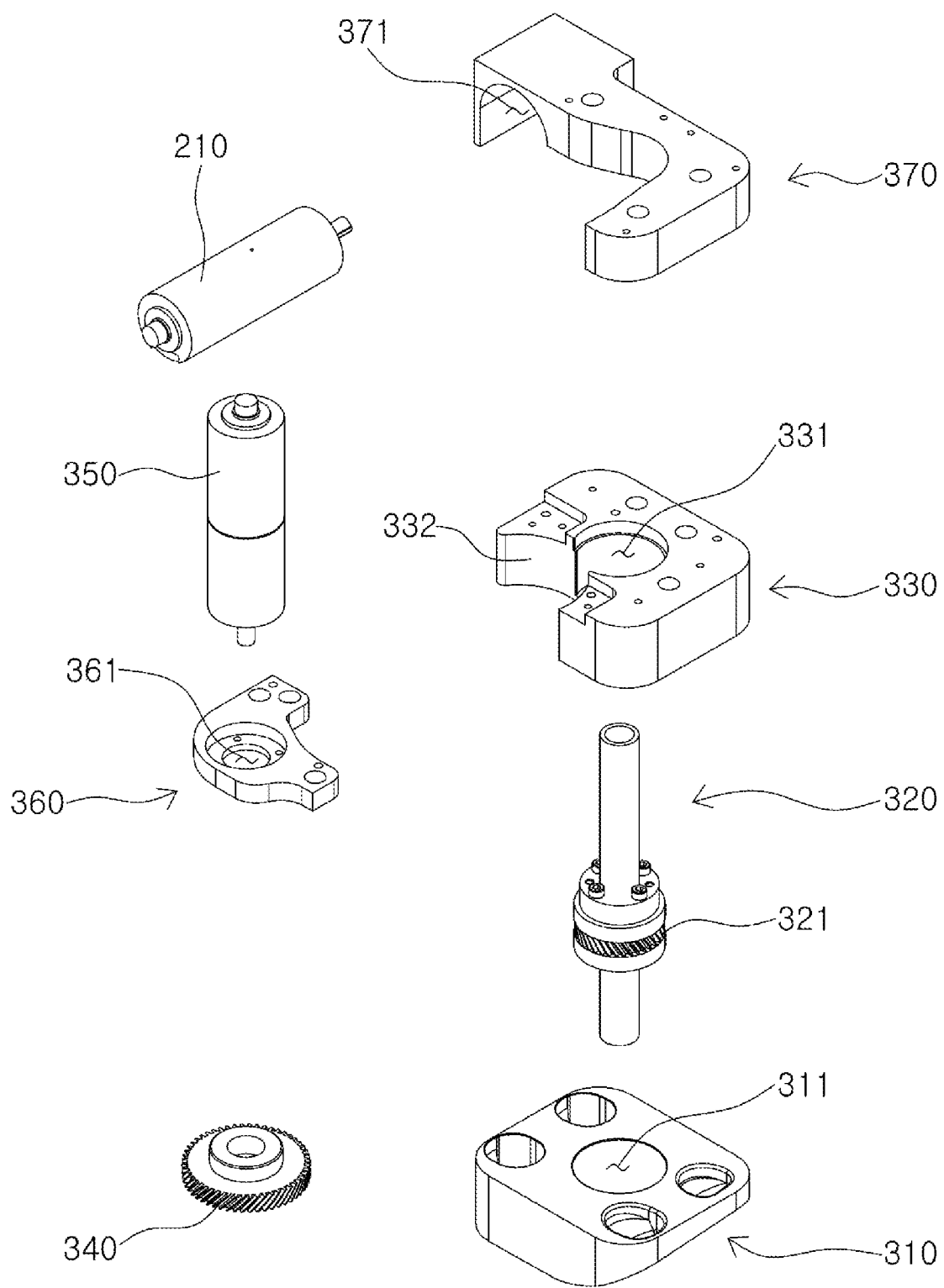
FIG. 8 is an exploded perspective view illustrating the autonomous steering apparatus of FIG. 7.

FIG. 7 is a view illustrating an autonomous steering apparatus according to an embodiment of the present invention, and FIG. 8 is an exploded perspective view illustrating the autonomous steering apparatus of FIG. 7.

An autonomous steering apparatus 30 may be connected to a steering system of the vehicle to adjust a driving state of the steering system of the vehicle. Accordingly, a direction in which the wheels of the vehicle are oriented may be adjusted according to an operating state of the autonomous steering apparatus 30. The autonomous steering apparatus 30 may be located on one side of the autonomous deceleration control apparatus 10. As an example, the autonomous steering apparatus 30 may be connected onto a shaft to which a steering wheel is connected so as to adjust the driving state of the steering system.

Referring to FIG. 7, the autonomous steering apparatus 30 includes a support bracket 310, a steering drive shaft 320, an upper bracket 330, and a steering driver 350.

The support bracket 310 may have a block structure having a preset volume. The support bracket 310 may be formed at an inner upper portion thereof with a lower reception portion 311. The lower reception portion 311 may have a groove or hole structure recessed downward by a preset depth.

The steering drive shaft 320 may have a preset length, and may have a lower end rotatably provided in the lower reception portion 311 of the support bracket 310. The steering drive shaft 320 may have an upper end connected to the steering system. Accordingly, the driving state of the steering system may be controlled by a rotational direction and a degree of rotation of the steering drive shaft 320. A steering drive portion 321 may be provided at one longitudinal point of the steering drive shaft. The steering drive portion 321 allows the power provided from an outside to be transmitted to the steering drive shaft 320, so that the steering drive shaft 320 may be rotated about a longitudinal direction. As an example, the steering drive portion 321 may be configured as gear teeth provided on an outer circumference at the one longitudinal point of the steering drive shaft 320. The steering drive portion 321 may be located in a region above a top surface of the support bracket 310.

The upper bracket 330 may be coupled to the top surface of the support bracket 310. An upper reception portion 331 may be formed vertically through an inner central region of the upper bracket 330, and the steering drive shaft 320 may be located in the upper reception portion 331. A size of the upper reception portion 331 may correspond to an outer circumference of the steering drive portion 321, so that the steering drive portion 321 may be located inside the upper reception portion 331, and an upper portion of the steering drive shaft 320 may protrude upward from the upper bracket 330. The upper bracket 330 may be provided on one side thereof with a power transmission portion 332 having a groove structure recessed inward from the outside. The power transmission portion 332 may be connected to the upper reception portion 331. Accordingly, the steering drive shaft 320 received in the upper reception portion 331 may be exposed in a lateral direction of the upper bracket 330 through the power transmission portion 332.

A shaft drive member 340 may be provided in the power transmission portion 332 and connected to the steering drive shaft 320. The shaft drive member 340 may be connected to the steering drive portion 321 to provide a power for adjusting a state (i.e., a rotational or stop state, a rotational direction, a rotational speed, etc.) of the steering drive shaft 320. As an example, the shaft drive member 340 may be configured as a gear rotatably engaged with the steering drive portion 321.

The steering driver 350 may be connected to the shaft drive member 340 to rotate the shaft drive member 340. An auxiliary support member 360 may be provided in the power transmission portion 332, and the steering driver 350 may be fixed to the auxiliary support member 360. The auxiliary support member 360 may have a connection hole 361 formed vertically through the auxiliary support member 360, so that the steering driver 350 may be fixed to a top surface of the auxiliary support member 360 and connected to the shaft drive member 340 through the connection hole 361. The steering driver 350 may be configured as a motor, etc.

In addition, a steering driver encoder (380 of FIG. 9) may be connected to the steering driver 350 to provide an operating state of the steering driver 350, a rotational state of the steering drive shaft 320 corresponding to the operating state of the steering driver 350, and data related to the direction in which the wheels of the vehicle are oriented to a steering module controller 390.

An auxiliary bracket 370 may be connected to an upper portion of the upper bracket 330. The auxiliary bracket 370 may fix the driver 210 configured to drive the autonomous deceleration control apparatus 10. The auxiliary bracket 370 may be located in a region which does not vertically overlap the upper reception portion 331 and the power transmission portion 332. The auxiliary bracket 370 may be formed in a bottom surface thereof with a driver reception portion 371 having a shape corresponding to an outer circumference of the driver 210. Accordingly, when the auxiliary bracket 370 is coupled to a top surface of the upper bracket 330 while the driver 210 is located in the driver reception portion 371, the driver 210 may be fixed to the autonomous steering apparatus 30.

The autonomous steering apparatus 30 may be effectively installed in an interior space of the vehicle to operate the steering system.

FIG. 9 is a view illustrating an autonomous driving system including the autonomous deceleration control apparatus and the autonomous steering apparatus.

Referring to FIG. 9, the autonomous deceleration control apparatus 10 may be controlled by the module controller 240.

The vehicle includes an autonomous driving system 1, and is provided to be autonomously driven.

The autonomous driving system 1 includes a driving sensor 2, a controller 3, an autonomous deceleration control apparatus 10, and an autonomous steering apparatus 30.

The driving sensor 2 is provided for the vehicle, and provides information on a situation around a place in which the vehicle is driven. For example, the driving sensor 2 includes a LiDAR, a radar, and a camera, and may provide information on whether an obstacle such as another pedestrian or another vehicle is present around the vehicle, a distance from the obstacle, a movement state of the obstacle, and the like.

The controller 3 controls the state of the vehicle while reflecting a signal that provides the driving sensor 2. For example, the controller 3 is configured on the basis of an artificial intelligence, and controls elements, such as the engine, the steering system, and the transmission of the vehicle such that the driving speed, the driving direction, and the like of the vehicle are controlled. Further, the controller 3 controls the operational state of the brake system through control of the autonomous deceleration control apparatus 10. Further, when the driver directly operates at least one of the elements of the vehicle, the controller 3 may control the elements that are not operated by the driver or stop the autonomous driving state.

The autonomous deceleration control apparatus 10 is provided to include the module controller 240, and the module controller 240 may control the operational state of the autonomous deceleration control apparatus 10 according to a signal of the controller 3. If the controller 3 determines that braking is necessary, through the information provided by the driving sensor 2 in the autonomous driving state, it transmits a braking signal that is information on the magnitude of the braking force required through the brake system to the module controller 240. If the braking signal is received, the module controller 240 generates a driver control signal for driving the driver 210 such that the pedal link 110 is rotated to the location at which the braking force corresponding to the braking signal is generated, to control the driver 210. Further, the module controller 240 may generate a driver control signal with reference to movable link state information provided by the driver encoder 213.

Further, the module controller 240 may control the operational state of the brake control module 200 by using location information on the movable link 220 provided by the driver encoder 213 and rotational state information of the pedal link 110 provided by the pedal encoder 130. When the vehicle is autonomously driven by the controller 3, the location information on the movable link 220 provided by the driver encoder 213 and the rotational state information on the pedal link 110 provided by the pedal encoder 130 are provided to correspond to each other. In detail, when the movable link 220 is at the standby location, the pedal link 110 is located at the brake non-driving location. Further, when the movable link 220 is located at the driving location, the pedal link 110 is located to be rotated downwards by a preset distance by the movable link 220. Meanwhile, if the user presses the pedal link 110 in the autonomous driving state, the rotational state information on the pedal link 110 deviates from a value corresponding to the location information on the movable link 220. Accordingly, the module controller 240 may terminate the autonomous mode and move the movable link 220 to the manual mode location if the rotational state information on the pedal link 110 deviates from a value corresponding to the location information on the movable link 220 while the brake control module 200 is operated in the autonomous module.

The autonomous steering apparatus 30 may include the steering module controller 390, and the steering module controller 390 may control the operating state of the autonomous steering apparatus 30 according to a signal of the controller 3. The controller 3 may transmit a signal for maintaining or changing a direction of the wheel in response to the information provided by the driving sensor 2 in the autonomous driving state to the steering module controller 390. When the signal is received, the steering module controller 390 may operate the steering driver 350 to stop or rotate the steering drive shaft 320 such that the steering system is driven to maintain or change the direction of the wheel in response to the signal.

In addition, the steering module controller 390 may control the steering driver 350 by using the rotational state information (i.e., an angle and the number of clockwise or counterclockwise rotations of the steering drive shaft 320 based on a preset value) of the steering drive shaft 320, which is provided by the steering driver encoder 380.

Figure 10:
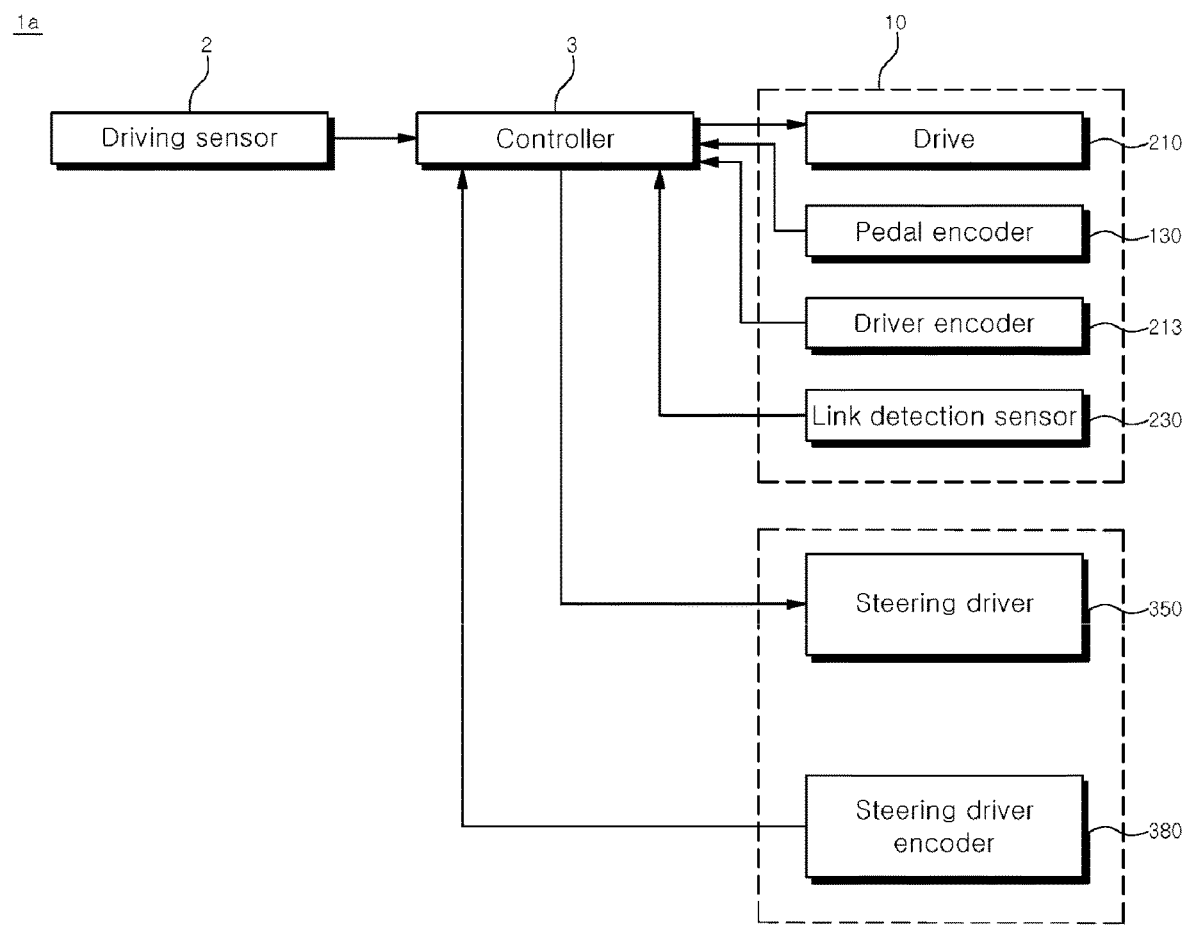
FIG. 10 is a view illustrating an autonomous driving system according to another embodiment.

FIG. 10 is a view illustrating an autonomous driving system according to another embodiment.

Referring to FIG. 10, the autonomous deceleration control apparatus 10 may be controlled by the controller 3. That is, at least one of the above-described module controller 240 illustrated in FIG. 7 and the steering module controller 390 may be integrated with the controller 3, and the controller 3 may perform the function of the above-described module controller 240 or the steering module controller 390.

Accordingly, in the state in which the vehicle is manually driven by the driver, the controller 3 switches the mode of the autonomous deceleration control apparatus 10 to the manual mode to control the driver 210 such that the movable link 220 is located at the manual mode location. Further, if the vehicle is in the autonomous driving state, the controller 3 controls the elements of the vehicle including the autonomous deceleration control apparatus 10 on the basis of the information provided by the driving sensor 2. In detail, if it is determined during driving of the vehicle that a braking force is necessary, the controller 3 controls the driver 210 to generate a braking force. Further, the controller 3 may control the operational state of the brake control module 200 by using location information on the movable link 220 provided by the driver encoder 213 and rotational state information of the pedal link 110 provided by the pedal encoder 130.

In addition, the controller 3 may control the operating state of the steering driver 350 to adjust the direction of the wheel.

Because the method for controlling, by the controller 3, the autonomous deceleration control apparatus 10 and the autonomous steering apparatus 30 is the same as or similar to the method for controlling, by the above-described module controller 240 of FIG. 9, the autonomous deceleration control apparatus 10, and the method for controlling, by the steering module controller 390, the autonomous steering apparatus 30, a detailed description thereof will be omitted.

The above detailed description exemplifies the present invention. Furthermore, the above-mentioned contents describe the exemplary embodiment of the present invention, and the present invention may be used in various other combinations, changes, and environments. That is, the present invention can be modified and corrected without departing from the scope of the present invention that is disclosed in the specification, the equivalent scope to the written disclosures, and/or the technical or knowledge range of those skilled in the art. The written embodiment describes the best state for implementing the technical spirit of the present invention, and various changes required in the detailed application fields and purposes of the present invention can be made. Accordingly, the detailed description of the present invention is not intended to restrict the present invention in the disclosed embodiment state. Furthermore, it should be construed that the attached claims include other embodiments.

What is claimed is:

1. An autonomous steering apparatus comprising:
   a support bracket having a preset volume, and formed at an inner upper portion thereof with a lower reception portion having a groove or hole structure recessed downward by a preset depth;
   a steering drive shaft having a preset length, and having a lower end rotatably provided in the lower reception portion and an upper end connected to a steering system of a vehicle;
   an upper bracket having an upper reception portion formed vertically through an inner central region of the upper bracket, coupled to a top surface of the support bracket such that the steering drive shaft is located in the upper reception portion, and provided on one side thereof with a power transmission portion having a groove structure recessed inward from an outside and connected to the upper reception portion; and
   a shaft drive member provided in the power transmission portion and connected to the steering drive shaft.

2. The autonomous steering apparatus of claim 1, wherein a steering drive portion having a gear tooth structure is provided on an outer circumference at one longitudinal point of the steering drive shaft, and
   the shaft drive member is configured as a gear rotatably engaged with the steering drive portion.

3. The autonomous steering apparatus of claim 1, further comprising a steering driver connected to the shaft drive member to rotate the shaft drive member.

4. The autonomous steering apparatus of claim 3, further comprising a steering driver encoder connected to the steering driver to detect an operating state of the steering driver.

5. An autonomous driving system comprising:
a driving sensor;
a controller configured to control a state of a vehicle while reflecting a signal provided by the driving sensor;
an autonomous deceleration control apparatus configured to control a brake system of the vehicle; and
an autonomous steering apparatus configured to control a steering system of the vehicle,
wherein the autonomous steering apparatus includes:
- a support bracket having a preset volume, and formed at an inner upper portion thereof with a lower reception portion having a groove or hole structure recessed downward by a preset depth;
- a steering drive shaft having a preset length, and having a lower end rotatably provided in the lower reception portion and an upper end connected to a steering system of a vehicle;
- an upper bracket having an upper reception portion formed vertically through an inner central region of the upper bracket, coupled to a top surface of the support bracket such that the steering drive shaft is located in the upper reception portion, and provided on one side thereof with a power transmission portion having a groove structure recessed inward from an outside and connected to the upper reception portion; and
- a shaft drive member provided in the power transmission portion and connected to the steering drive shaft.

\* \* \* \* \*

UNITED STATES PATENT AND TRADEMARK OFFICE
CERTIFICATE OF CORRECTION

| | | |
|---|---|---|
| PATENT NO. | : 11,364,893 B2 | Page 1 of 1 |
| APPLICATION NO. | : 16/720804 | |
| DATED | : June 21, 2022 | |
| INVENTOR(S) | : Choi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 390 days.

Signed and Sealed this
Thirtieth Day of January, 2024

*Katherine Kelly Vidal*

Katherine Kelly Vidal
*Director of the United States Patent and Trademark Office*